Dec. 18, 1923.
P. C. VEINOT
RAKE
Filed Feb. 9, 1923
1,477,612
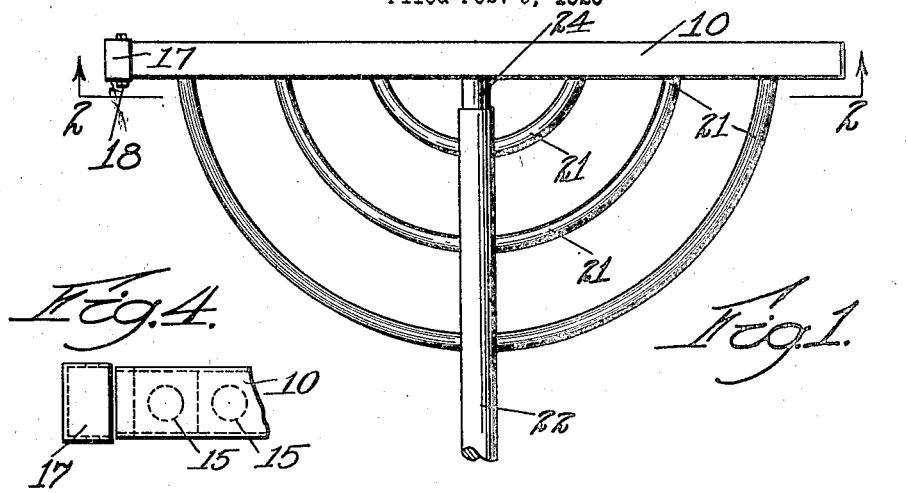
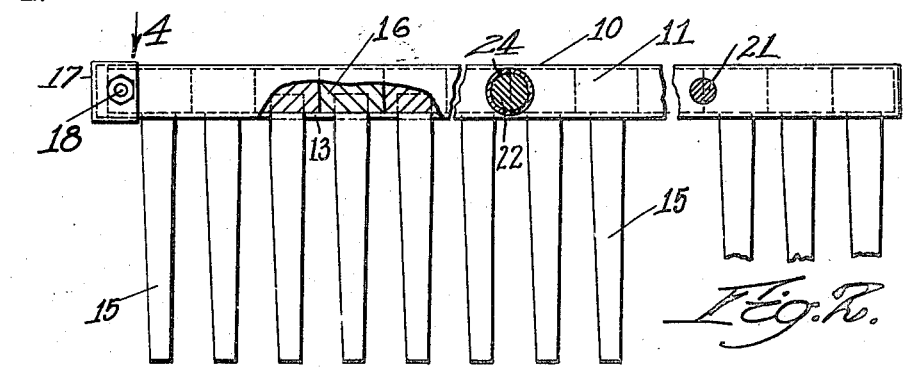
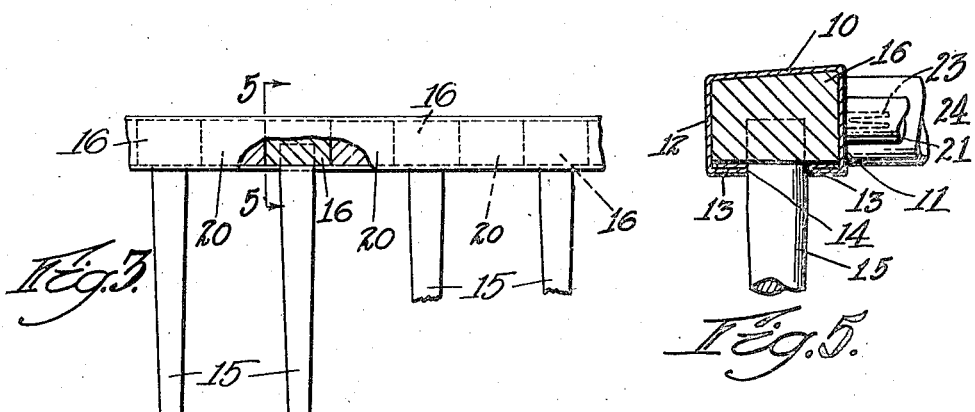
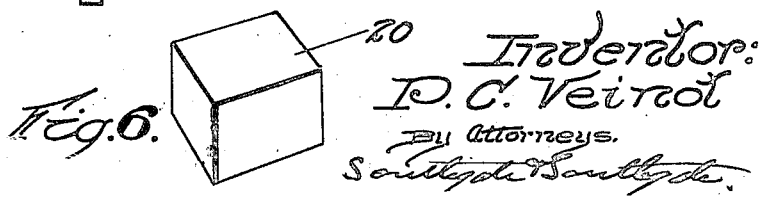
Inventor:
P. C. Veinot
By Attorneys.

Patented Dec. 18, 1923.

1,477,612

UNITED STATES PATENT OFFICE.

PERCIVAL C. VEINOT, OF WEST MANCHESTER, MASSACHUSETTS.

RAKE.

Application filed February 9, 1923. Serial No. 618,125.

*To all whom it may concern:*

Be it known that I, PERCIVAL C. VEINOT, a citizen of the United States, residing at West Manchester, in the county of Essex and State of Massachusetts, have invented a new and useful Rake, of which the following is a specification.

This invention relates to a rake having removable, detachable, replaceable teeth.

The principal objects of the invention are to provide a device of this character in which the teeth can be located at different distances apart so as to make the rake suitable either for a hay rake or lawn rake; to provide means whereby the teeth are all held in position without the use of individual screws or other fastening devices for the respective teeth, and to provide only one fastening device for the whole series of teeth so as to avoid the liability of losing screws and bolts and thus rendering the device useless, and also facilitating the replacement of broken teeth; to provide an arrangement whereby when the teeth are separated to render the rake useful as a hay rake, the head bar will be all filled up solid with teeth and blanks and the fastening of the parts together will be just the same as if the teeth were all in place; and to provide the bar head of such shape that the teeth will not become loose by usage.

Further objects and advantages of the invention will appear hereinafter.

Reference is to be had to the accompanying drawing, in which

Fig. 1 is a plan of a rake constructed in accordance with this invention;

Fig. 2 is an elevation looking in the direction of the arrows 2—2 in Fig. 1 showing parts in section and on an enlarged scale;

Fig. 3 is a similar view showing the rake teeth separated at a greater distance apart for use as a hay rake;

Fig. 4 is a plan of one end of the device showing the fastening means detached;

Fig. 5 is a transverse sectional view on the line 5—5 of Fig. 3 on an enlarged scale, and Fig. 6 is a perspective view of one of the spacing blocks.

I have shown the invention as comprising a bar head 10 formed of a piece of sheet metal of a general channel form of trapezoidal shape having two opposite sides 11 and 12, one higher than the other, connected by a sheet metal top located on a slight inclination. At the bottom the two sides 11 and 12 are bent inwardly and doubled over to form horizontal bottom flanges 13 which, although made of sheet metal like galvanized iron, are comparatively rigid and constitute the bottom surface of the bar head and have a space 14 between them for the teeth 15.

Each of these teeth is mounted in a block as 16. Each of these blocks is formed of the same shape as the inside of the bar head, as indicated in Fig. 5 which is slanting on the top and its front and rear walls of different heights while the bottom is horizontal. The teeth project from the bottom wall at right angles thereto preferably. In assembling the rake it is to be noticed that one end of the bar head is closed. The blocks 16 are inserted from the open end until the rake is filled, as shown in Fig. 2 and then a cap 17 of the same general shape as the cross section of the bar head is applied over the open end thereof and a bolt 18 fastened through it and through perforations near the open end of the head. This securely fastens all the teeth or blocks in position and completes the rake.

This rake, as above described is adapted to be used as a lawn rake. If it is desired to place the teeth farther apart so that it can be used as a hay rake, additional blocks 20 are provided of the same shape as the blocks 16 but not having any teeth projecting therefrom. These are inserted one between each two adjacent teeth as shown in Fig. 3 and thus a rake is provided in which the teeth are twice as far apart as in the other case. This rake assembled in this way is closed or finished by the use of the cap 17 and bolt 18, as described above.

On account of using a metallic bar head, the usual curved bands 21 which are connected with the handle 22 are secured to the rear side of this head by means of integral split rivets 23 projecting therefrom. On this head also is fixed a ferrule 24 for receiving the end of the handle located at a small inclination.

A rake constructed in this way is strong and durable and has no parts that are likely to become loose or lost except the one bolt and cap. All the fastening of the teeth is accomplished by this one part and no screws or bolts have to be put in through the teeth. On account of the shape of the bar head the teeth are not likely to work loose.

It will be understood that there is a front pull and backward pull, the former being greater than the latter because the rake is then loaded. I have arranged the teeth, or rather the blocks, to be cut one inch square and three quarters of an inch thick on the front side where the pull comes hardest, and five eighths of an inch thick on the rear. The tops of the teeth make a slant toward the front of the rake bar. This makes the pull come diagonally toward the uppermost corner, the one at the right in Fig. 5 and from the diagonally opposite corner when the rake is drawn forward by the handle. This prevents any lifting of the teeth or rocking. The rake is just as strong when used with half as many teeth, as shown in Fig. 3. One of the principal points is that, on account of the shape of the cross-section of the head, the teeth will not become wobbly.

Although I have illustrated and described only a single form of the invention, I am aware of the fact that modifications can be made therein by any person skilled in the art without departing from the scope of the invention as expressed in the claims.

Therefore, I do not wish to be limited to all the details of construction herein shown and described, but what I do claim is:

1. In a rake, the combination of a metallic bar head formed of sheet material having its front and rear sides vertical and at the same level at the bottom, one taller than the other, and a slanting top side, the edges of the bottom being bent inwardly in the same plane to form bottom flanges having a longitudinal space between them, said head being closed at one end and open at the other, a series of blocks of the same shape as the interior of said head located therein, certain of said blocks being provided with teeth projecting therefrom through the space between said flanges, and a cap of the same general shape as the said head fitting over the open end thereof.

2. In a rake, the combination of a metallic bar head formed of sheet material having its front and rear sides vertical and at the same level at the bottom, one taller than the other, and a slanting top side, the edges at the bottom being bent inwardly in the same plane and doubled on each other to form bottom flanges having a longitudinal space between them, said head being closed at one end and open at the other, a series of blocks of the same shape as the interior of said head located therein, certain of said blocks being provided with teeth projecting therefrom through the space between said flanges, a cap of the same general shape as the said head fitting over the open end thereof, and a bolt extending through the cap and the end of the head for securing the cap in closed position and preventing the shifting of the blocks in the head.

In testimony whereof I have hereunto affixed my signature.

PERCIVAL C. VEINOT.